(12) United States Patent
Park et al.

(10) Patent No.: US 10,790,944 B2
(45) Date of Patent: Sep. 29, 2020

(54) COMB INTERLACING OF DFT-SPREADED DATA AND REFERENCE SIGNALS

(71) Applicant: QUALCOMM Incorporated, San Diego, CA (US)

(72) Inventors: Seyong Park, San Diego, CA (US); Wei Zeng, San Diego, CA (US); Yi Huang, San Diego, CA (US); Renqiu Wang, San Diego, CA (US); Hao Xu, Beijing (CN); Peter Gaal, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 15/711,826

(22) Filed: Sep. 21, 2017

(65) Prior Publication Data

US 2018/0145803 A1    May 24, 2018

Related U.S. Application Data

(60) Provisional application No. 62/424,286, filed on Nov. 18, 2016.

(51) Int. Cl.
*H04L 5/00* (2006.01)
*H04L 27/26* (2006.01)
(Continued)

(52) U.S. Cl.
CPC .......... *H04L 5/0007* (2013.01); *G06F 17/141* (2013.01); *H04B 7/0452* (2013.01);
(Continued)

(58) Field of Classification Search
CPC ............... H04L 5/0007; H04L 27/2636; H04L 27/2613; H04L 5/0048; H04W 72/0413;
(Continued)

(56) References Cited

U.S. PATENT DOCUMENTS 9,014,165 B2    4/2015  Kim et al.
2006/0262870 A1*  11/2006  Khan .................. H04L 27/2614
                                                                375/260

(Continued)

FOREIGN PATENT DOCUMENTS

WO    WO-2011053836 A2    5/2011

OTHER PUBLICATIONS

International Search Report and Written Opinion—PCT/US2017/059562—ISA/EPO—dated Feb. 6, 2018.

*Primary Examiner* — Sai Aung
*Assistant Examiner* — Liem H. Nguyen
(74) *Attorney, Agent, or Firm* — Patterson & Sheridan, L.L.P

(57) ABSTRACT

Certain aspects of the present disclosure provide techniques for processing reference and data signals for uplink transmission. A method is provided for wireless communications. The method generally includes obtaining different sets of samples for at least one of: a data signal or a reference signal; spreading the different sets of samples for the at least one data signal or reference signal using separate discrete Fourier transform (DFT) processing blocks; interlacing the spreaded sets of samples by assigning the spreaded sets of samples from each of the separate DFT processing blocks to equally spaced tones; and transmitting the at least one data signal or reference signal on the assigned tones in an orthogonal frequency division multiplexed (OFDM) symbol.

28 Claims, 17 Drawing Sheets

(51) Int. Cl.
*G06F 17/14* (2006.01)
*H04B 7/0452* (2017.01)
*H04W 72/04* (2009.01)

(52) U.S. Cl.
CPC ........ *H04L 5/0048* (2013.01); *H04L 27/2613* (2013.01); *H04L 27/2636* (2013.01); *H04W 72/0413* (2013.01); H04J 2211/005 (2013.01)

(58) Field of Classification Search
CPC . G06F 17/141; H04B 7/0452; H04J 2211/005
See application file for complete search history.

(56) References Cited

U.S. PATENT DOCUMENTS

| | | | |
|---|---|---|---|
| 2007/0153673 A1* | 7/2007 | Tomisato | H04L 27/2614 |
| | | | 370/208 |
| 2011/0110304 A1 | 5/2011 | Kuchi et al. | |
| 2011/0176632 A1 | 7/2011 | Jeong et al. | |
| 2011/0249548 A1 | 10/2011 | Gaal et al. | |
| 2012/0044886 A1* | 2/2012 | Jang | H04L 1/0072 |
| | | | 370/329 |
| 2013/0301538 A1 | 11/2013 | Muharemovic et al. | |
| 2016/0192385 A1* | 6/2016 | Tooher | H04L 5/0051 |
| | | | 370/336 |
| 2016/0254889 A1 | 9/2016 | Shattil | |
| 2016/0285526 A1* | 9/2016 | Hedayat | H04B 7/0452 |

* cited by examiner

COMB INTERLACING OF DFT-SPREADED DATA AND REFERENCE SIGNALS

CROSS-REFERENCE TO RELATED APPLICATION & PRIORITY CLAIM

This application claims benefit of and priority to U.S. Provisional Patent Application Ser. No. 62/424,286, filed Nov. 18, 2016, which is herein incorporated by reference in its entirety for all applicable purposes.

INTRODUCTION

Aspects of the present disclosure relate to wireless communications, and more particularly, to signal transmission of data and reference signals.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques for processing reference and data signals for uplink transmission.

Certain aspects of the present disclosure provide a method for wireless communications. The method generally includes obtaining different sets of samples for at least one of: a data signal or a reference signal; spreading the different sets of samples for the at least one data signal or reference signal using separate discrete Fourier transform (DFT) processing blocks; interlacing the spreaded sets of samples by assigning the spreaded sets of samples from each of the separate DFT processing blocks to equally spaced tones; and transmitting the at least one data signal or reference signal on the assigned tones in an orthogonal frequency division multiplexed (OFDM) symbol.

Certain aspects of the present disclosure provide an apparatus for wireless communications. The apparatus generally includes means for obtaining different sets of samples for at least one of: a data signal or a reference signal; means for spreading the different sets of samples for the at least one data signal or reference signal using separate DFT processing blocks; means for interlacing the spreaded sets of samples by assigning the spreaded sets of samples from each of the separate DFT processing blocks to equally spaced tones; and means for transmitting the at least one data signal or reference signal on the assigned tones in an OFDM symbol.

Certain aspects of the present disclosure provide an apparatus for wireless communications. The apparatus generally includes at least one processor coupled with a memory and configured to: obtain different sets of samples for at least one of: a data signal or a reference signal; spread the different sets of samples for the at least one data signal or reference signal using separate DFT processing blocks; and interlace the spreaded sets of samples by assigning the spreaded sets of samples from each of the separate DFT processing blocks to equally spaced tones. The apparatus generally also includes a transmitter configured to transmit the at least one data signal or reference signal on the assigned tones in an OFDM symbol.

Certain aspects of the present disclosure provide a computer readable medium having computer executable code stored thereon for wireless communications. The computer readable medium generally includes code for obtaining different sets of samples for at least one of: a data signal or a reference signal; code for spreading the different sets of samples for the at least one data signal or reference signal using separate DFT processing blocks; code for interlacing the spreaded sets of samples by assigning the spreaded sets of samples from each of the separate DFT processing blocks to equally spaced tones; and code for transmitting the at least one data signal or reference signal on the assigned tones in an OFDM symbol.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
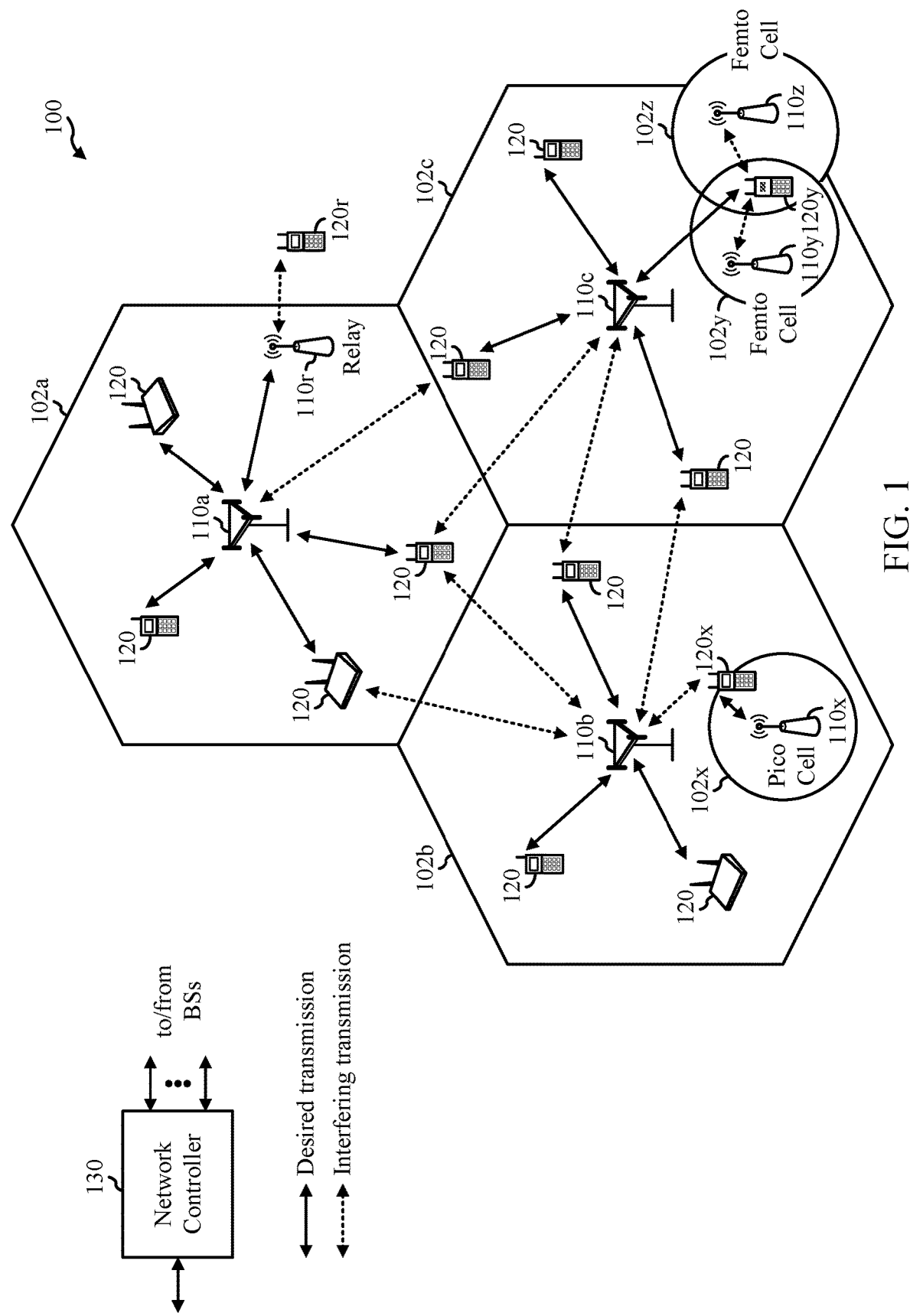
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technologies).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to uplink signal processing for 5G uplink bursts. For example, aspects provide for separate discrete Fourier transform (DFT) processing and tone mapping of reference signals and data in an orthogonal frequency division multiplexing (OFDM) symbol.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. NR wireless communication systems may employ short uplink bursts. As described herein, for example, with respect to FIG. 8, a UE performs uplink signal processing, for example, for the short uplink burst including reference signals and data. UEs 120 may be configured to perform the operations 800 and methods described herein for uplink signal processing. The BS 110 may perform complementary operations to the operations 800 by the UE 120.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cell (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
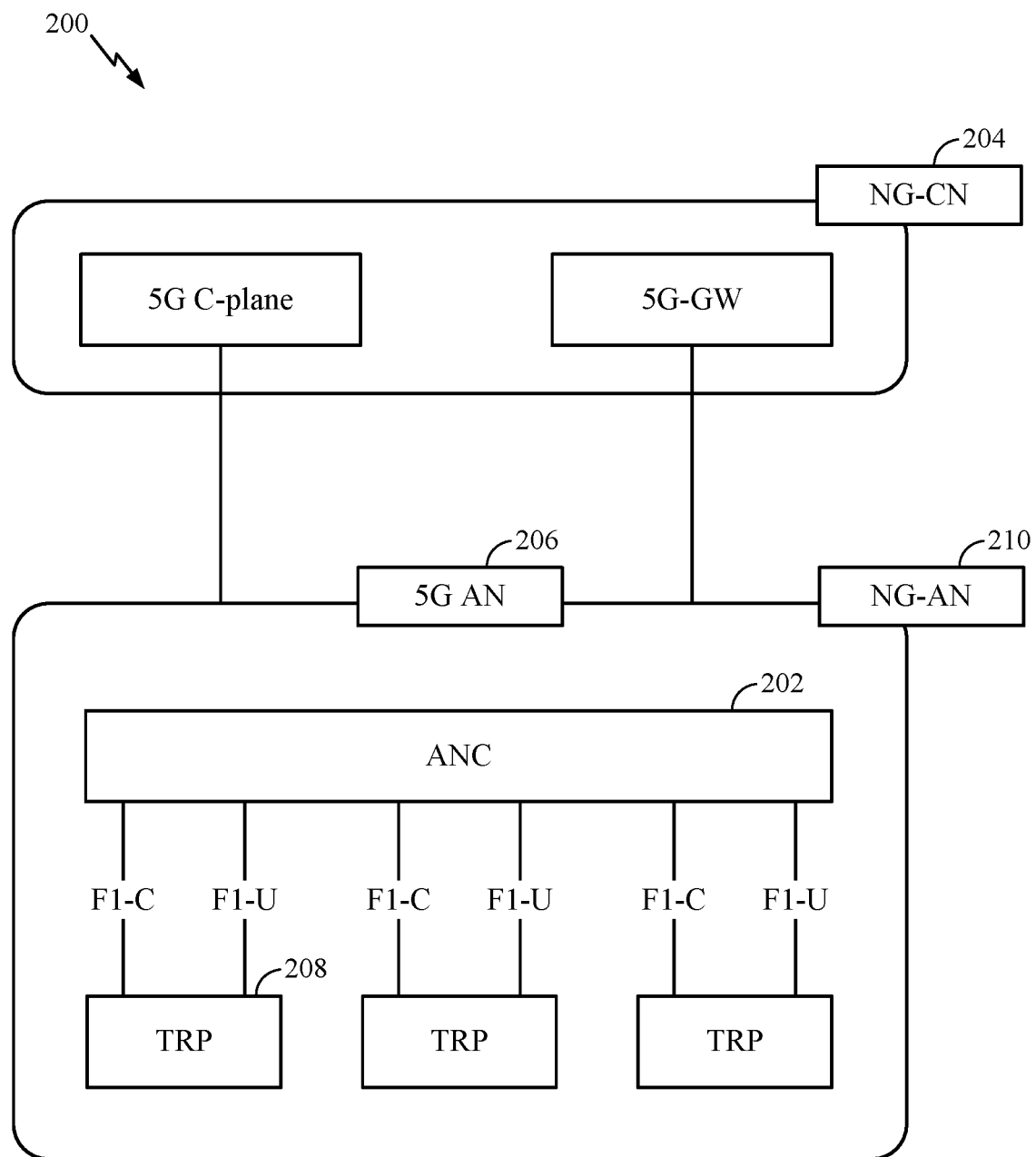
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
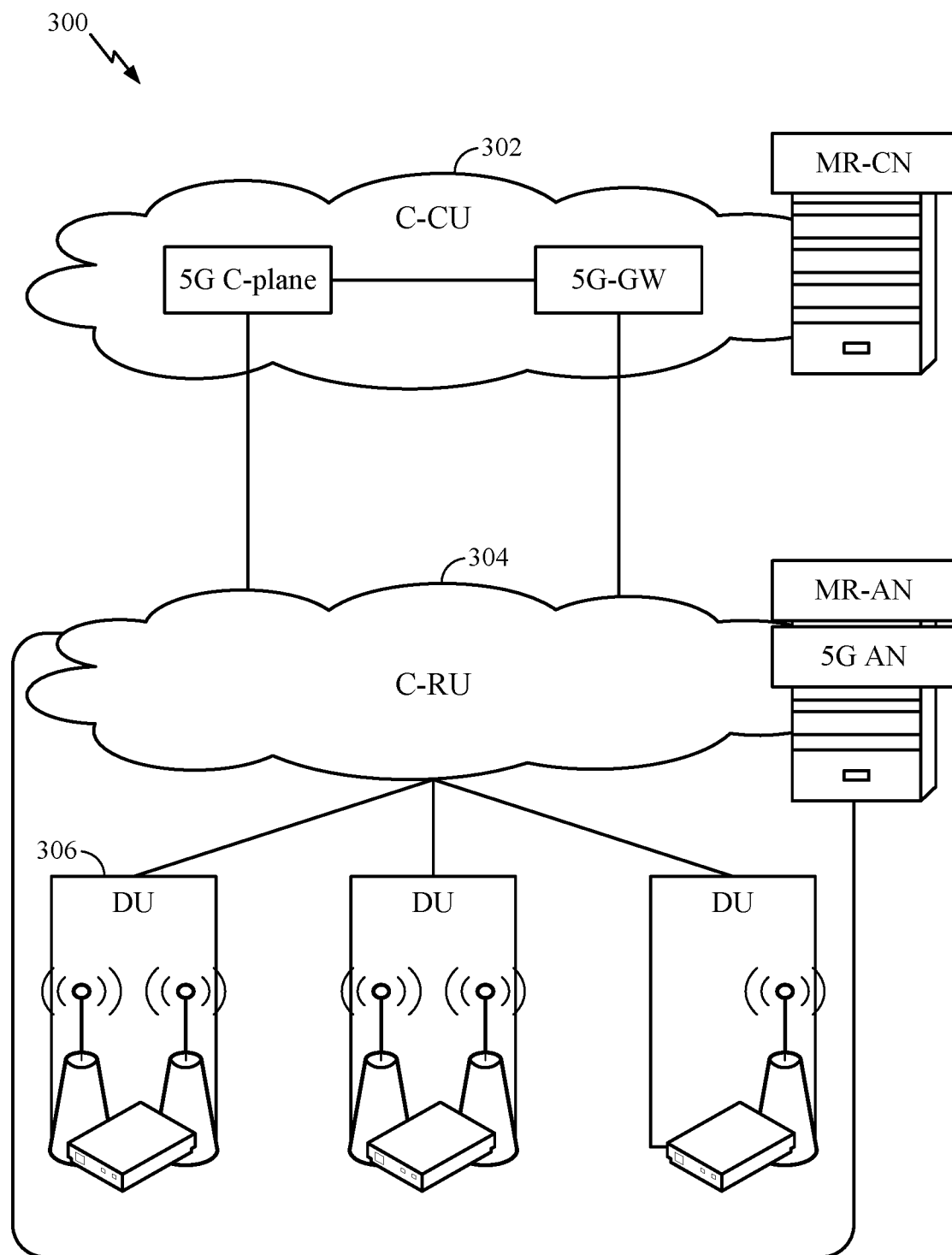
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
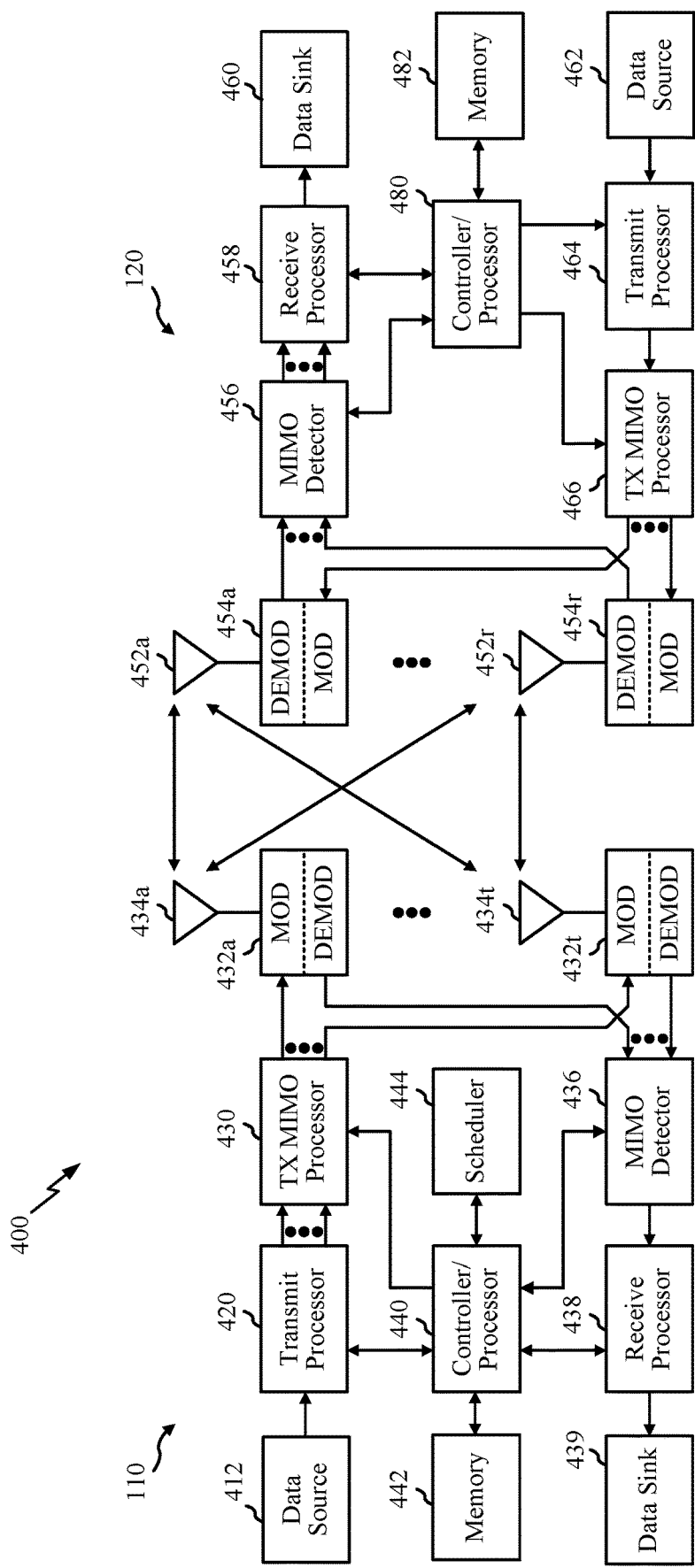
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform the operations 800 described herein and illustrated with reference to FIG. 8 and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of the functional blocks illustrated in FIG. 8, and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
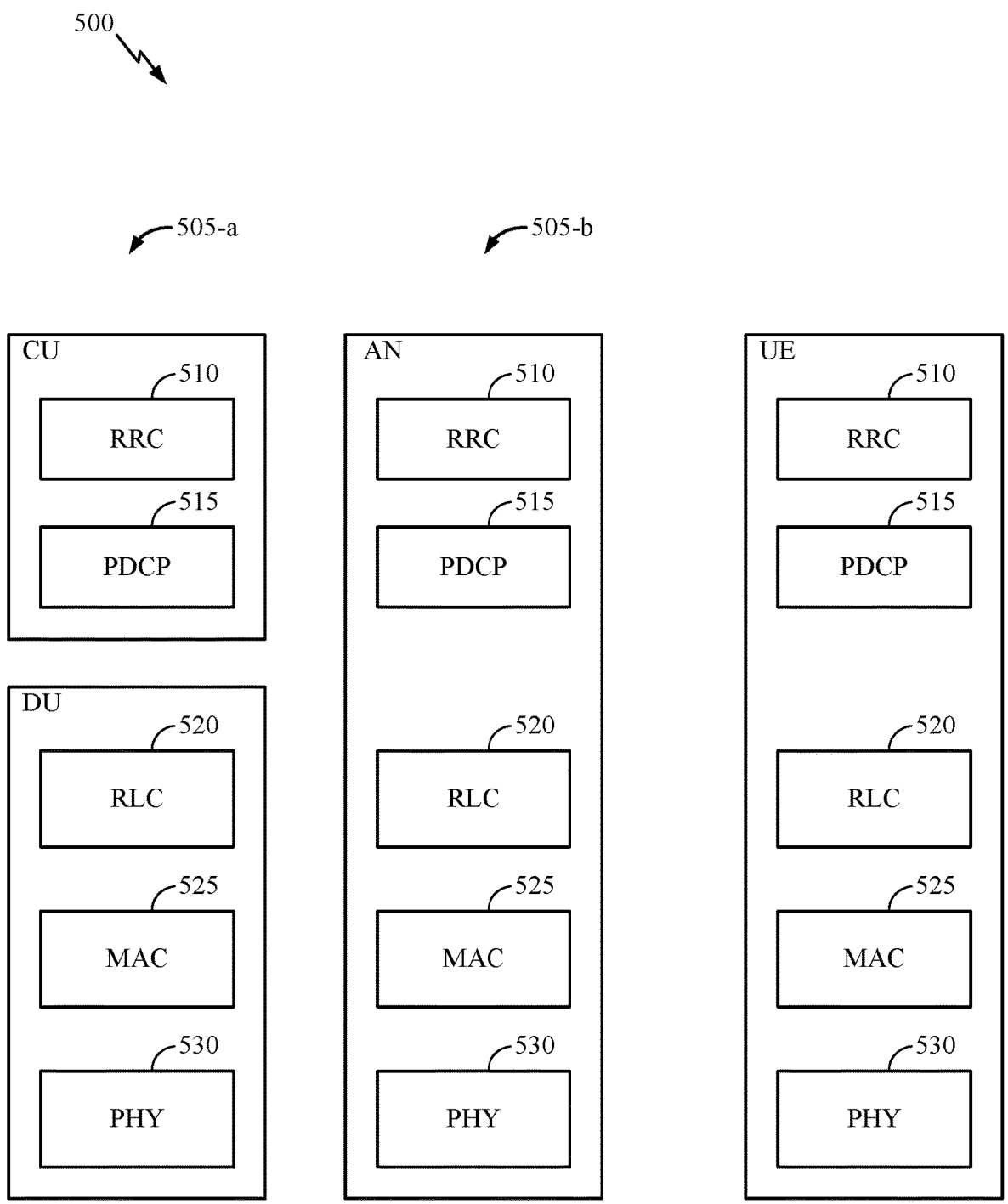
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
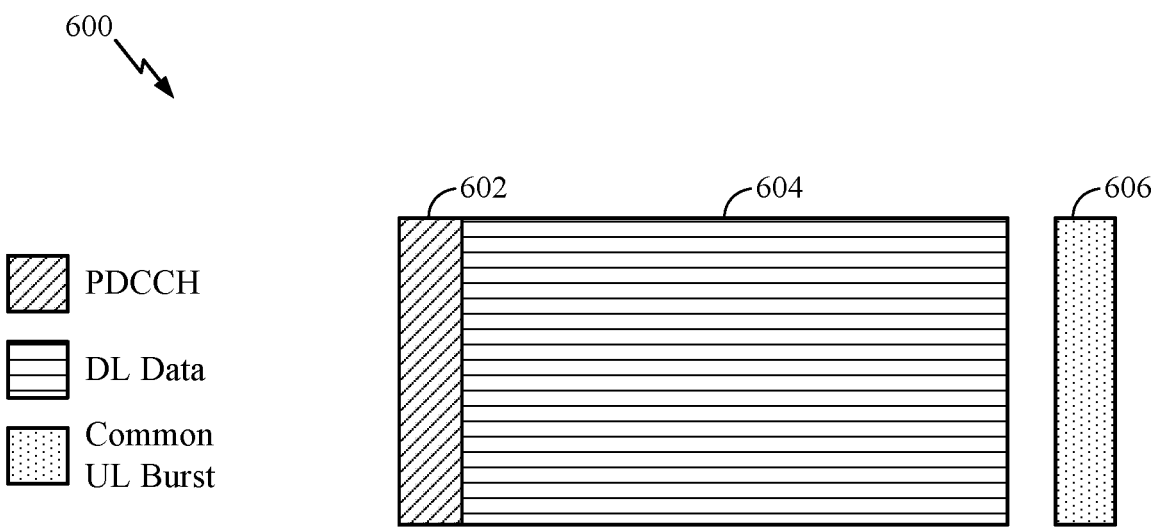
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
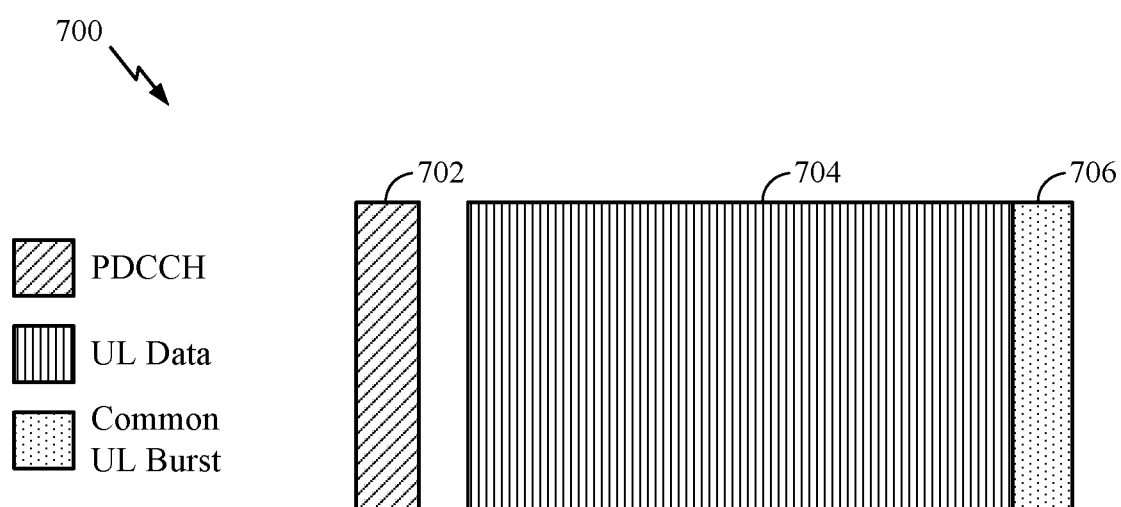
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Comb Interlacing of DFT-Spreaded Data and Reference Signals

Discrete Fourier Transform spread Orthogonal Frequency Division Multiplexing (DFT-s-OFDM) is a technique which can reduce Peak to Average Power Ratio (PAPR) of OFDM transmissions. DFT-s-OFDM may be applied, for example, in short uplink burst transmissions from a NR UE.

When reference signals (RS) and data signals coexist in a single OFDM symbol, DFT-s-OFDM mixes the RS and data. Thus, after DFT-spreading of the RS and data, the frequency tones are typically mixed, which prevents FDM of the RS and data in a single OFDM symbol.

Accordingly, techniques for uplink processing of RS and data that include DFT spreading to reduce PAPR, but that still allow for FDM of the signals are desirable.

Aspects of the present disclosure provide techniques whereby DFT-spreading is applied to RS and data separately (e.g., using separate DFT processing blocks) and then the DFT-spread RS and data are comb interlaced, which may enable FDM of the RS and data in a single OFDM symbol. Thus, the techniques presented herein may help exploit both FDM properties of OFDM and low PAPR property of DFT-s-OFDM.

Figure 8:
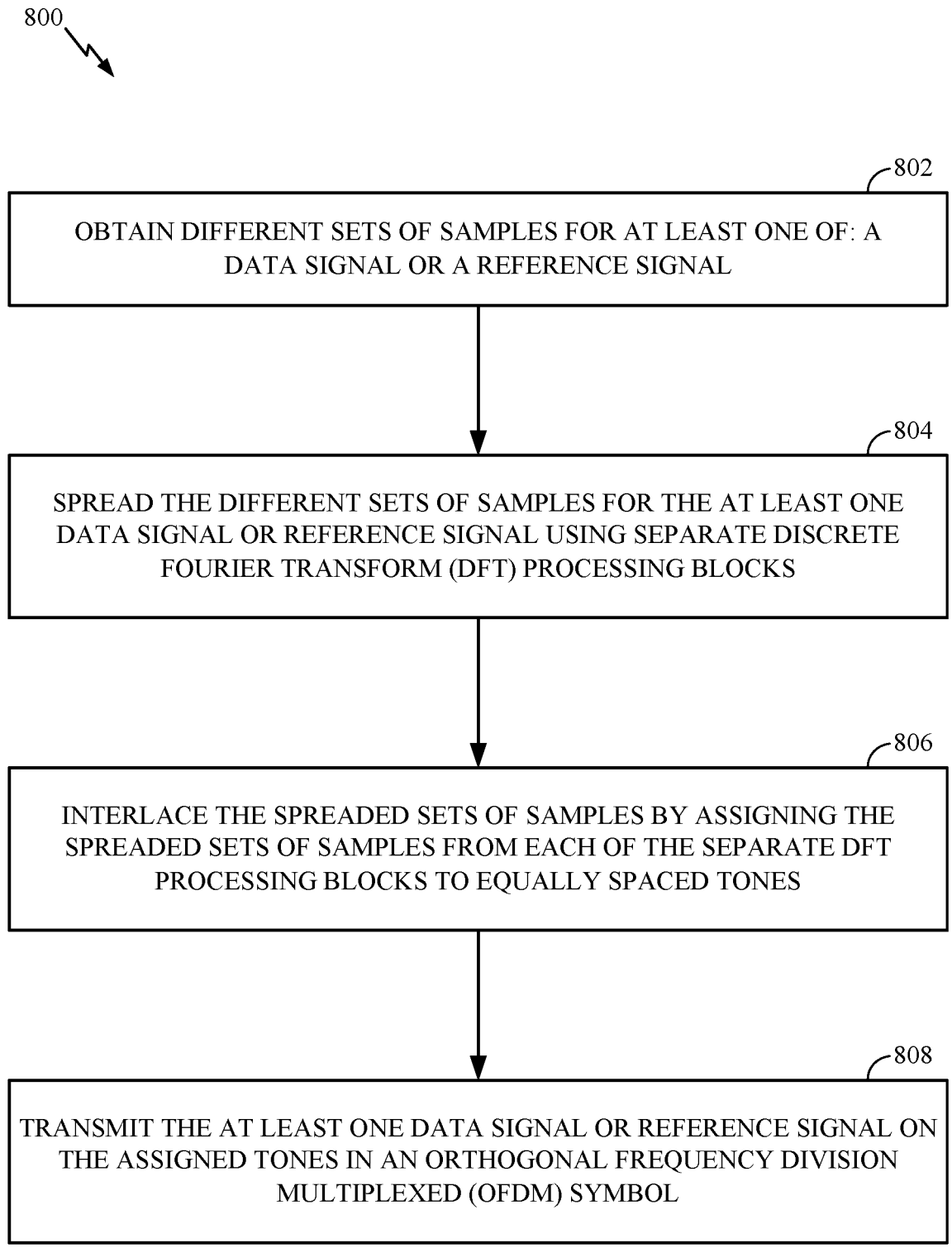
FIG. 8 example operations performed by a wireless device, in accordance with certain aspects of the present disclosure.

FIG. 8 illustrated example operations 800 that may be performed by a wireless device such as a user equipment (UE) (e.g., UE 120) for uplink signal processing, in accordance with aspects of the present disclosure. For example, operations 800 may be performed by a NR UE to process data and RS to be sent in a short UL burst transmission.

Operations 800 begin, at 802, by obtaining different sets of samples for at least one of: a data signal or a reference signal. At 804, UE spreads the different sets of samples for the at least one data signal or reference signal using separate DFT processing blocks. At 806, the UE interlaces the spreaded sets of samples by assigning the spreaded sets of samples from each of the separate DFT processing blocks to equally spaced tones. For example, the data signals may be assigned to odd tones and the reference signals may be assigned to even tones. At 808, the UE transmits the at least one data signal or reference signal on the assigned tones in an OFDM symbol.

Figure 9:
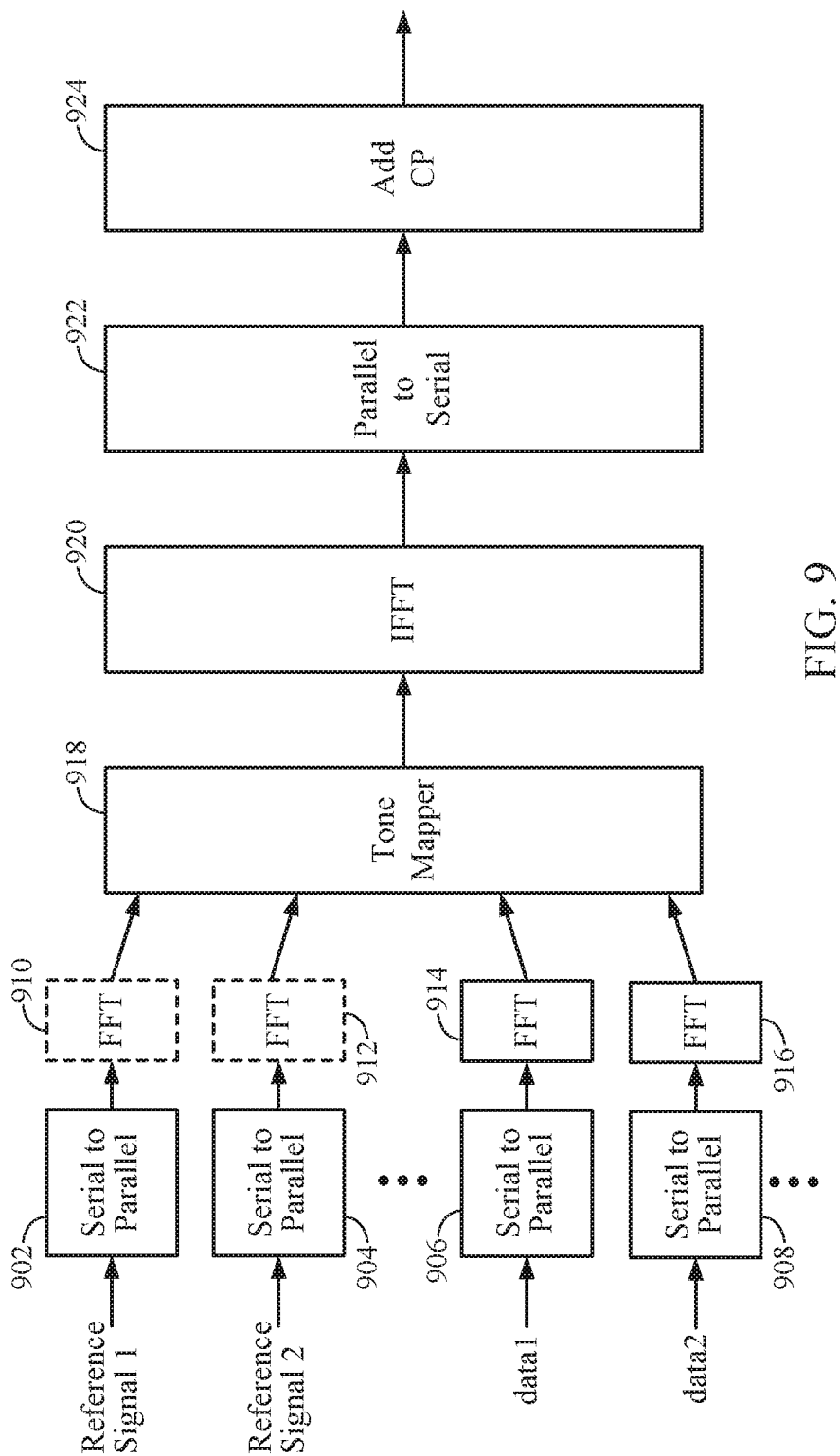
FIG. 9 illustrates example processing blocks for uplink signal processing for reference signals and data, in accordance with certain aspects of the present disclosure.

FIG. 9 illustrates processing blocks for uplink signal processing of reference signals and data signals. As described herein and shown in FIG. 9, interlaced DFT-s-OFDM processing may be achieved with a general structure using one or multiple data and RS blocks. In FIG. 9, two reference signals and two data blocks are shown; however, as will be shown in FIGS. 10-16 below, different number of reference signals and data blocks can be processed for uplink transmission in an OFDM symbol using the techniques described herein.

As shown in FIG. 9, the general structure for the uplink processing may include passing the signals through serial-to-parallel converters 902, 904, 906, and 908, respectively, before the spreading operations and back through a parallel to serial converter 922 after the spreading. The data and RS may go through separate DFT-spreading blocks. For example, as shown in FIG. 9, reference signal 1 is spread by FFT processing block 910; reference signal 2 is spread by FFT processing block 912; data 1 is spread by FFT processing block 914; and data 2 is spread by FFT processing block 916. The FFT processing blocks convert the signals from the time-domain to the frequency domain. As will be described below with reference to FIGS. 10-16, different number of DFT spreading processing block can be used, for example, based on the pilot overhead and the size of the data blocks.

Figure 9A:
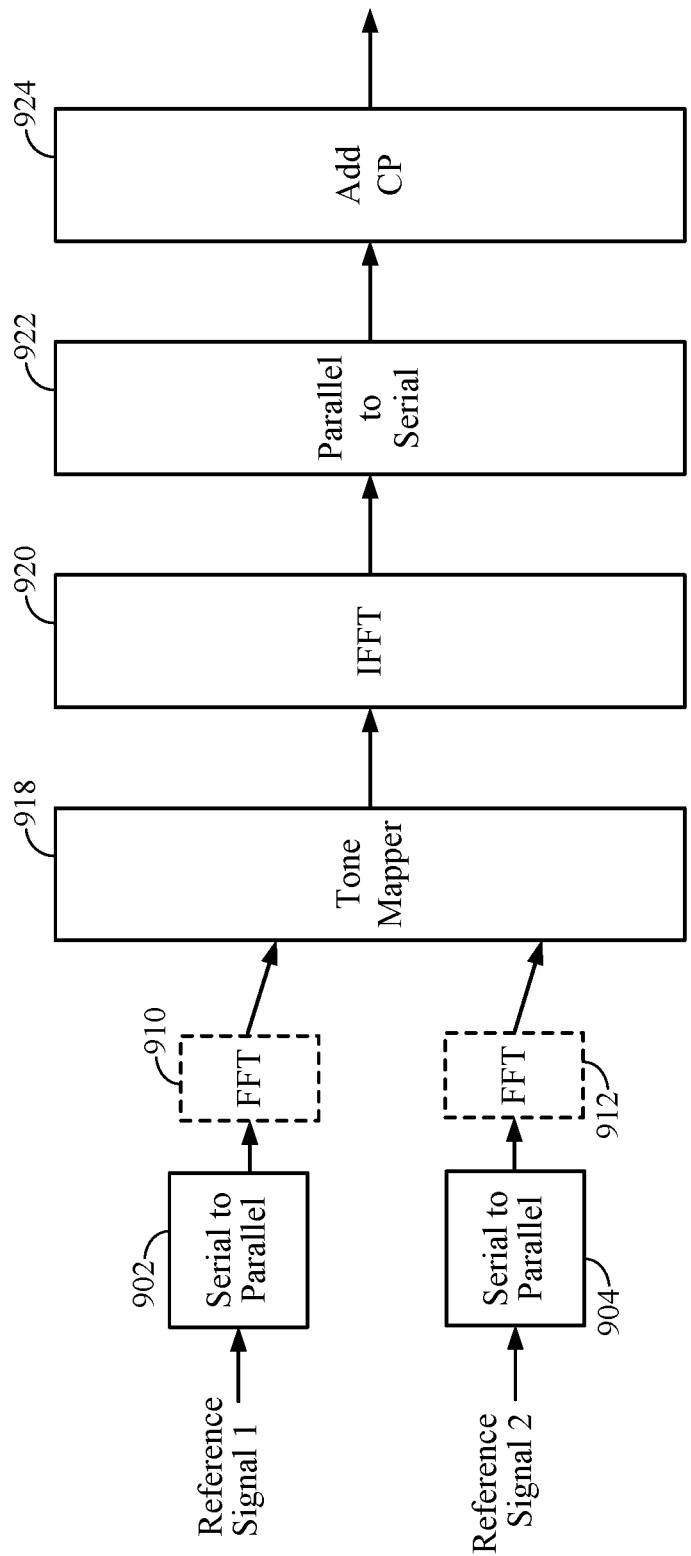
FIG. 9A illustrates example processing blocks for uplink signal processing for reference signals, in accordance with certain aspects of the present disclosure.
Figure 9B:
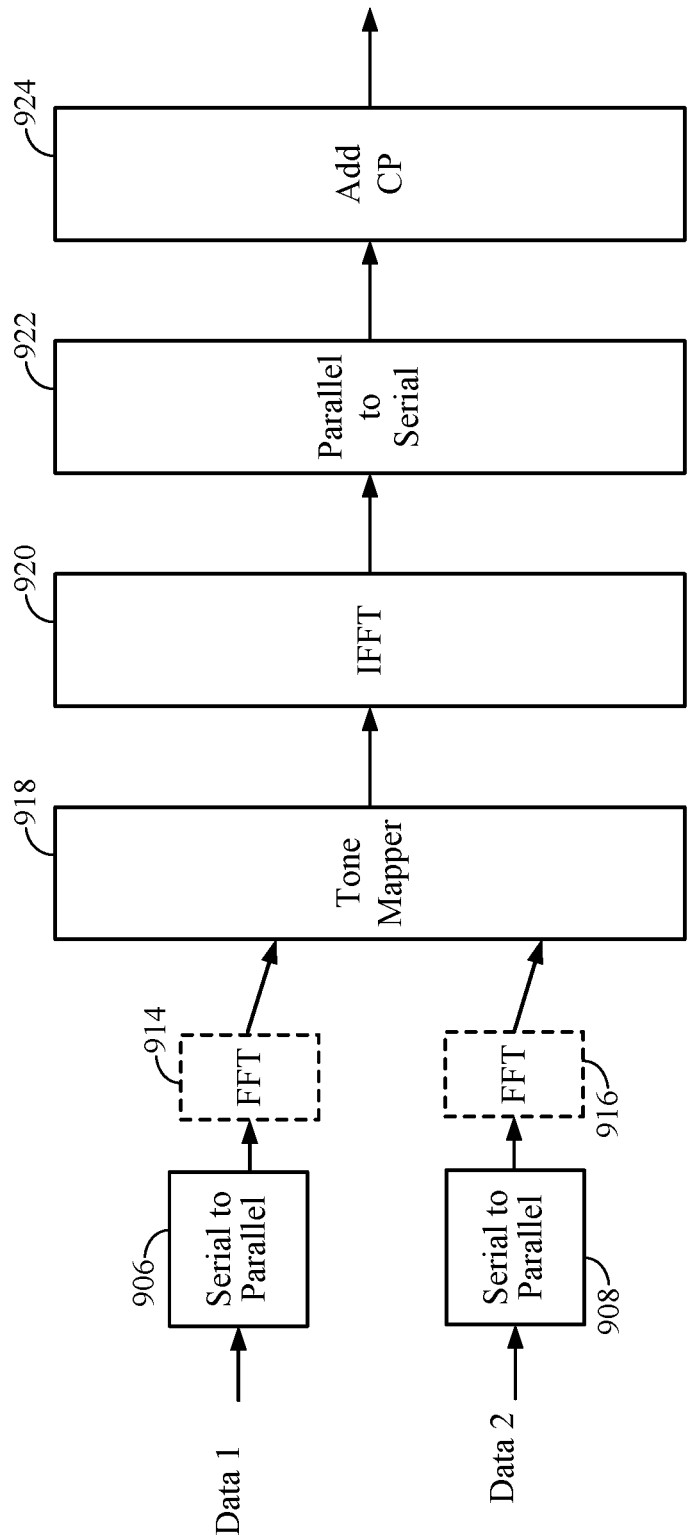
FIG. 9B illustrates example processing blocks for uplink signal processing for data signals, in accordance with certain aspects of the present disclosure.

According to certain aspects, separate DFT spreading processing blocks can be used for only different reference signals or for only different data signals. For example, as shown in FIG. 9A, reference signal 1 can be spread by FFT processing block 910 and reference signal 2 can be spread by FFT processing block 912. Tone mapper 918 can map the spread samples of the references signals according to mapping techniques described herein. As another example, as shown in FIG. 9B, data signal 1 can be spread by FFT processing block 914 and data signal 2 can be spread by FFT processing block 916. Tone mapper 918 can map the spread samples of the references signals according to mapping techniques described herein.

Figure 10:
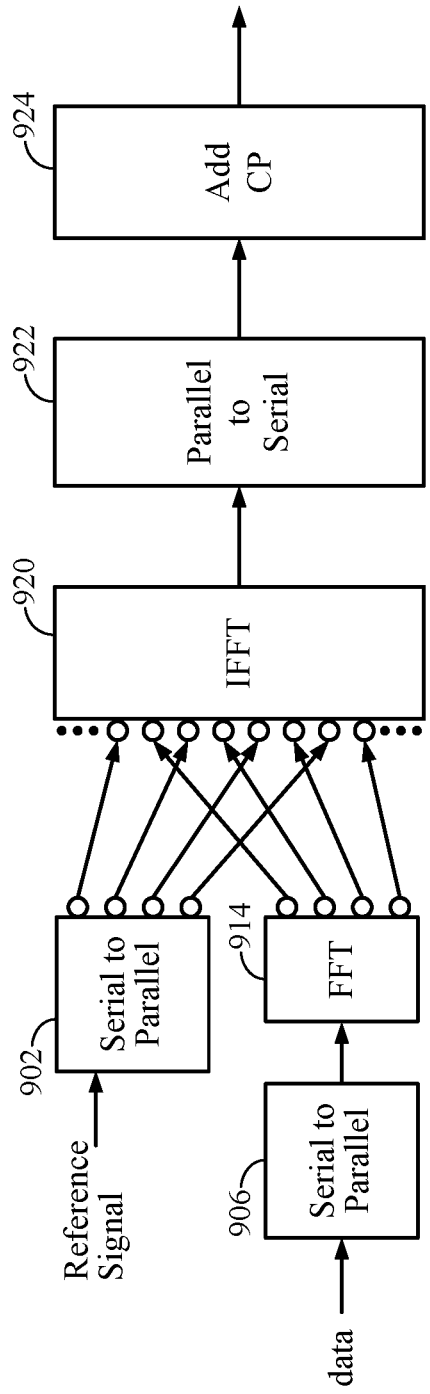
FIG. 10 illustrates example processing blocks for signal processing that skips certain reference signals for fast Fourier transform (FFT) processing, in accordance with certain aspects of the present disclosure.

According to certain aspects, for certain sequences selected for the RS (e.g., Zadoff-Chu sequence), the DFT-spread processing for the RS can be omitted. For example, as shown in FIG. 10, the FFT processing block (e.g., the FFT processing block 910 shown in FIG. 11) for reference signal 1 is omitted.

As shown in FIG. 9, the general structure for the uplink processing includes a tone mapper 918 that maps (e.g., assigns) the DFT-spread samples of the RS and data to frequency tones according to various interlacing patterns described in more detail below with respect to FIGS. 10-16. The inverse FFT (IFFT) processing block 920 coverts the samples from the frequency domain back to the domain, for example, into an OFDM symbol. The processing block 924 can insert a cyclic prefix (CP).

As described in more detail below with respect to FIGS. 10-16, the tone mapper map the spread samples output from the same DFT-spreading block to equally spaced tones.

This general processing structure described with respect to FIG. 9 is scalable to accommodate various sizes of data and/or RS signals. For example, in one option, a fixed number of FFT blocks may be used, and the number of tones (per FFT block) may be scaled. According to another option, a fixed number of tones may be used per FFT block, and the number of FFT blocks may be scaled. FIGS. 10-16 illustrate various processing structures, according to the general processing structure illustrated in FIG. 9, for various number and sizes of RS and data and using various numbers of separate DFT-spreading processing blocks. Although not shown in FIGS. 10-16, it may be understood that the tone mapper 918 performs the mapping of the FFT outputs to the IFFT input 920.

Example DFT-Spreading and Comb Interlacing for a ½ Pilot Overhead

Figure 11:
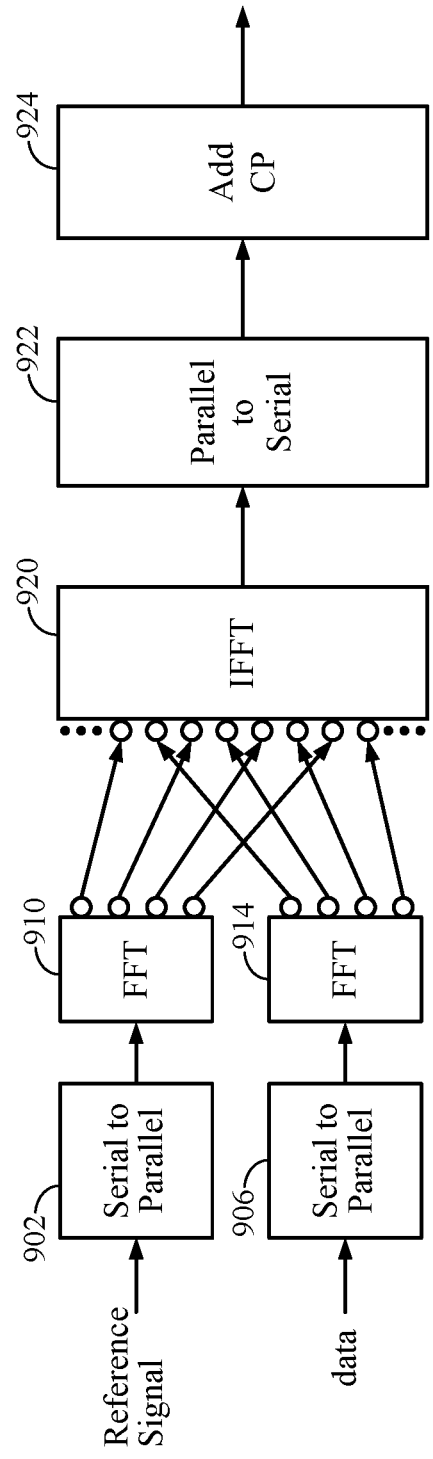
FIG. 11 illustrates example processing blocks for signal processing that for a ½ ratio pilot overhead with separate DFT processing of reference signals and data, in accordance with certain aspects of the present disclosure.

FIG. 11 illustrates a RS and a data signal spread using two separate DFT processing blocks. The reference signal shown in FIG. 11 has a pilot overhead of 1 to 2. (or in other words the size reference signal and data) As shown in FIG. 11, the reference signal is spread by the FFT processing block 910 and the spread samples are assigned to equal spaced tones—in this case, every other tone. As shown in FIG. 11, the RS tones and data tones have a comb interlacing in which the tones are alternating.

In some cases, data tones may be assigned to odd tones, while RS tones are assigned to even tones. The resulting interlaced RS and data tones may make FDM feasible. The example shown in FIG. 11 may be suitable to implement a comb interlace of RS and data signals with a pilot overhead ratio of 1 to 2 (½).

The number and size of (DFT/FFT) processing blocks for RS and/or data may be scaled according to the particular arrangement of RS and data signals (e.g., pilot overhead ratio).

Example DFT-Spreading and Comb Interlacing for a ⅓ Pilot Overhead

Figure 12:
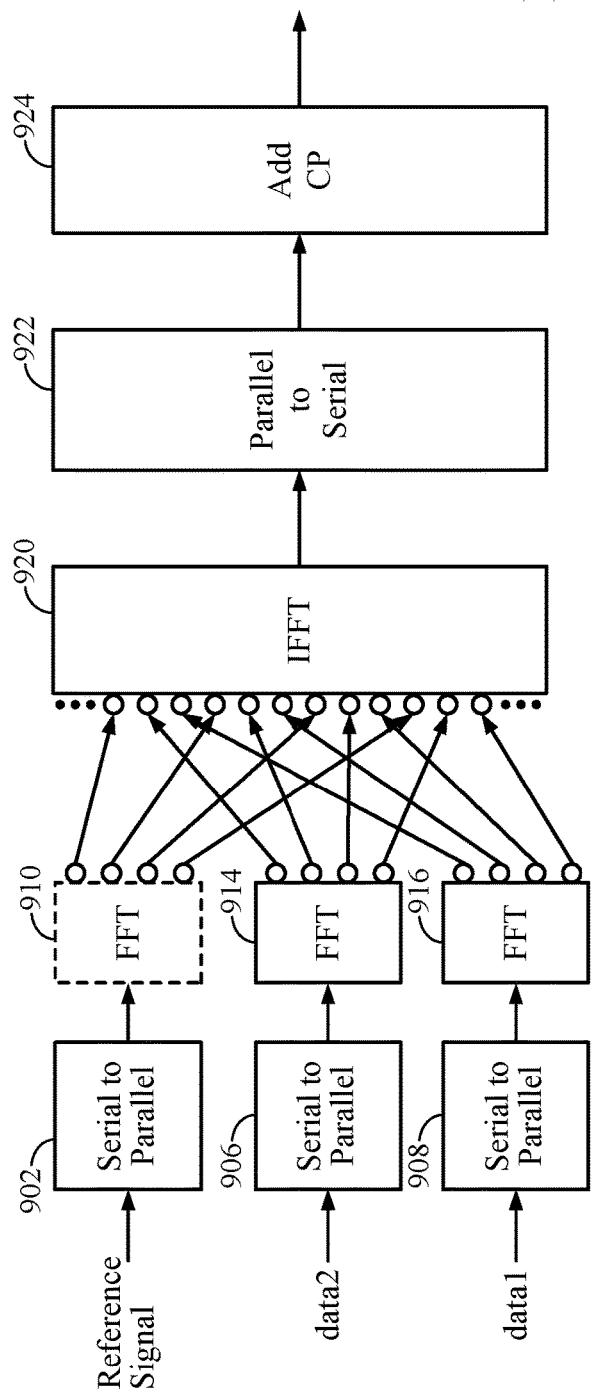
FIG. 12 illustrates example processing blocks for signal processing that for a ⅓ ratio pilot overhead with separate DFT processing of reference signals and two equal size data blocks, in accordance with certain aspects of the present disclosure.

For example, FIG. 12 illustrates a RS (e.g., a pilot) and two data blocks spread using three separate DFT processing blocks (of the same size). The RS has a pilot overhead ratio of ⅓ (e.g., twice as much data as reference signal). As shown in FIG. 12, the RS is spread by FFT processing block 910, data2 is spread by FFT processing block 914, and data1 is spread by FFT processing block 916.

As shown in FIG. 12, the RS and data have a comb interlacing having equal tone spacing for the output of each FFT block. For example, in FIG. 12, the RS and data are assigned every third tone. For example, RS is assigned tones 1, 4, 7; data2 is assigned tones 2, 5, 8; data1 is assigned tones 3, 6, 9; and so on.

Figure 13:
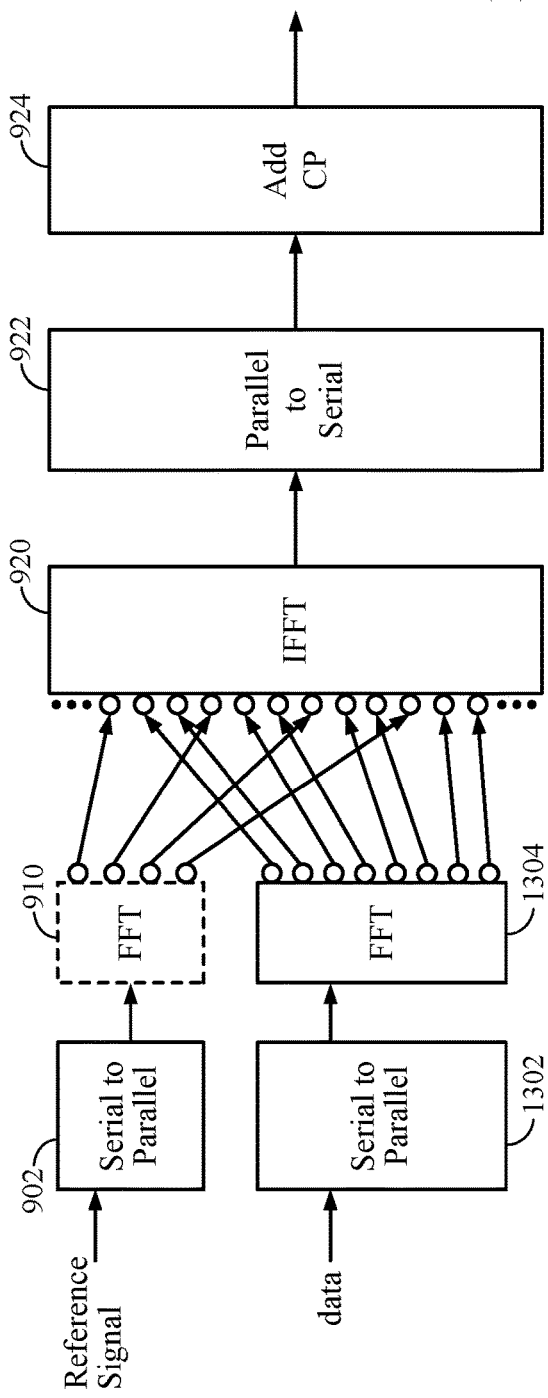
FIG. 13 illustrates example processing blocks for signal processing that for a ⅓ ratio pilot overhead with separate DFT processing of reference signals and one larger size data block, in accordance with certain aspects of the present disclosure.

FIG. 13 illustrates another example of processing for a pilot overhead ratio of ⅓ using only two separate DFT processing blocks. As shown in FIG. 13, instead of processing two equal size data blocks using separate FFT blocks, a single larger data block size may be used for data (e.g., twice the size of the RS) at the serial to parallel converter 1302 and FFT 1304. The RS can still be assigned every third tone, while the data is assigned every second and third tone.

Example DFT-Spreading and Comb Interlacing for a ¼ Pilot Overhead

Figure 14:
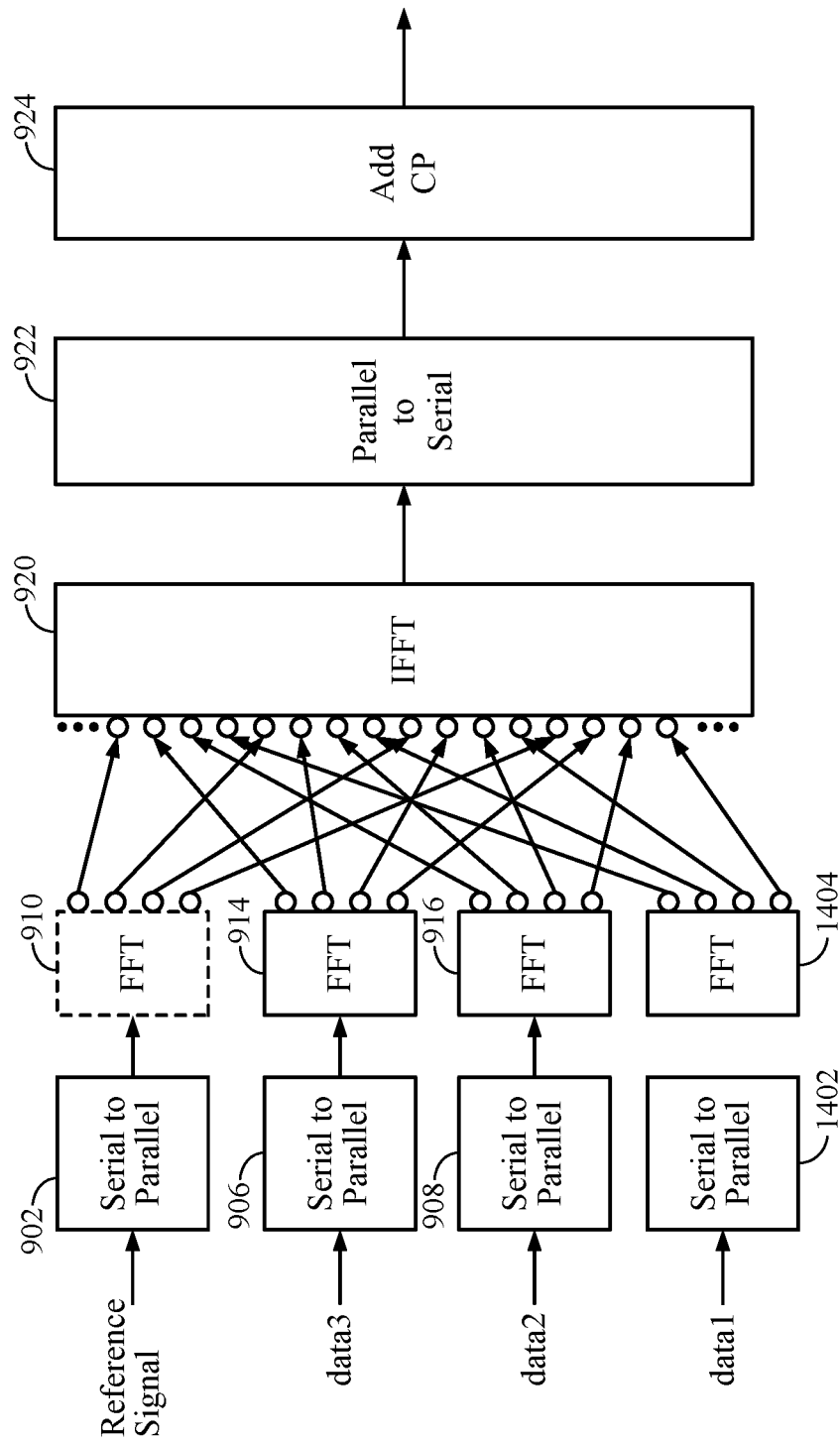
FIG. 14 illustrates example processing blocks for signal processing that for a ¼ ratio pilot overhead with separate DFT processing of reference signals and three data blocks, in accordance with certain aspects of the present disclosure.

FIG. 14 illustrates a RS and three data blocks spread using four separate DFT processing blocks. In FIG. 14, the reference signal a pilot overhead ratio of ¼ (the data is three times larger than the RS). As shown in FIG. 14, RS, data3, data2, and data 1 (of the same size) are processed the four separate FFT processing blocks 910, 914, 916, and 1404, respectively. The spread samples output from each of the FFTs can be assigned equal tone spacing. The RS and data can be assigned every fourth tone with a comb interlacing. For example, the reference signal may be assigned to tones 1, 5, 9; data3 may be assigned to tones 2, 6, 10; data2 may be assigned to tones 3, 7, 11; data1 may be assigned tones 4, 8, 12; and so on.

Figure 15:
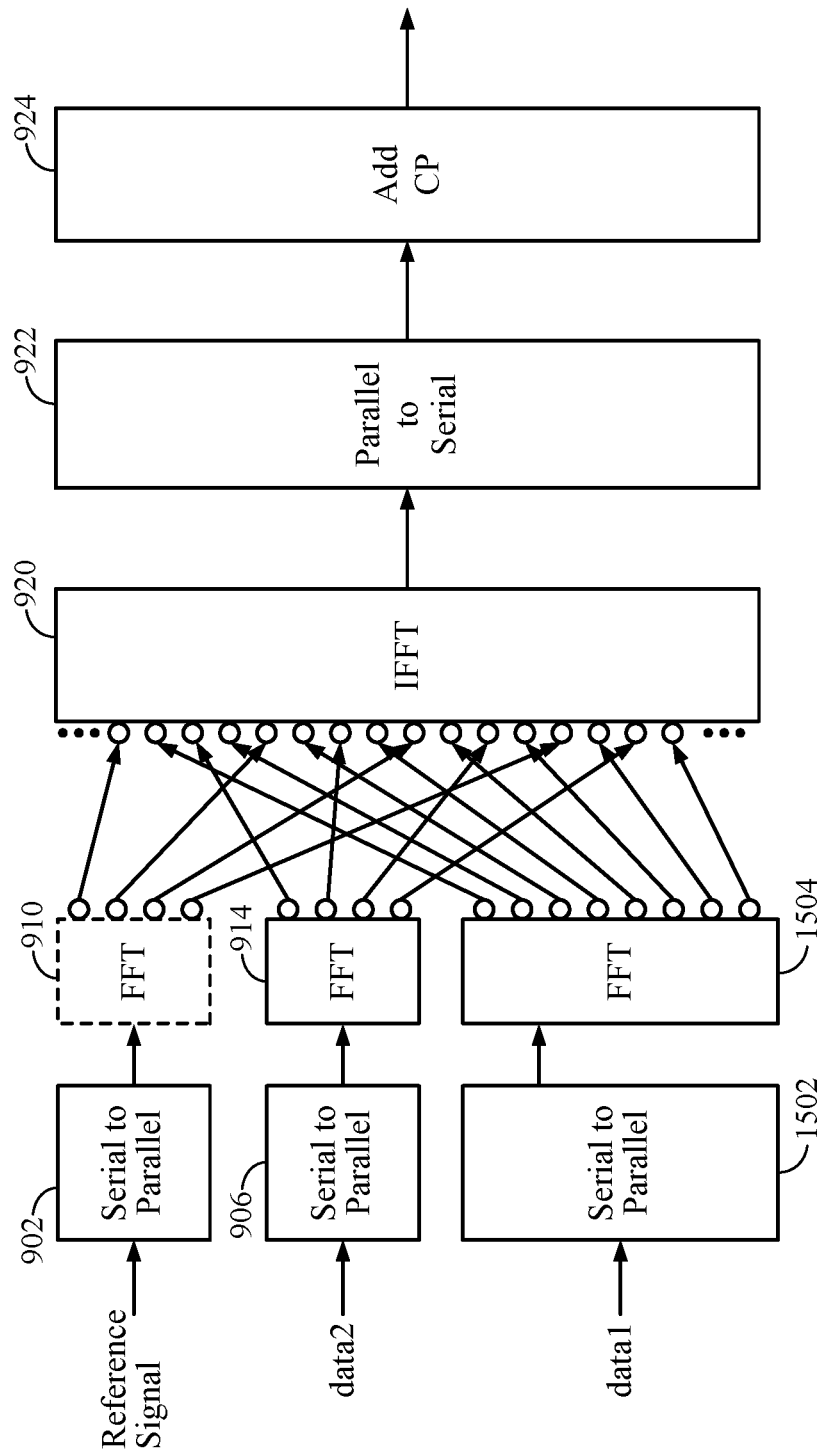
FIG. 15 illustrates example processing blocks for signal processing that for a ¼ ratio pilot overhead with separate DFT processing of reference signals, an equal size data block, and one larger size data block, in accordance with certain aspects of the present disclosure.

As shown in FIG. 15, a RS, an equal size data block, and a twice the size data block can processed using three separate FFTs processing blocks 910, 914, and 1504, respectively, for the pilot overhead ratio of ¼. The RS samples output from the FFT processing block 910 and the data2 samples output from the FFT processing block 914 can be assigned an equal tone spacing of every fourth tone. The data1 samples output from the larger FFT processing block 1504 can be assigned two tones, every fourth tone. For example, the RS samples can be assigned tones 1, 5, 9, 13; data2 can be assigned tones 3, 7, 11 15; and data1 can be assigned tones 2, 4, 6, 8, 10, 12, 14, 16; and so on.

Figure 16:
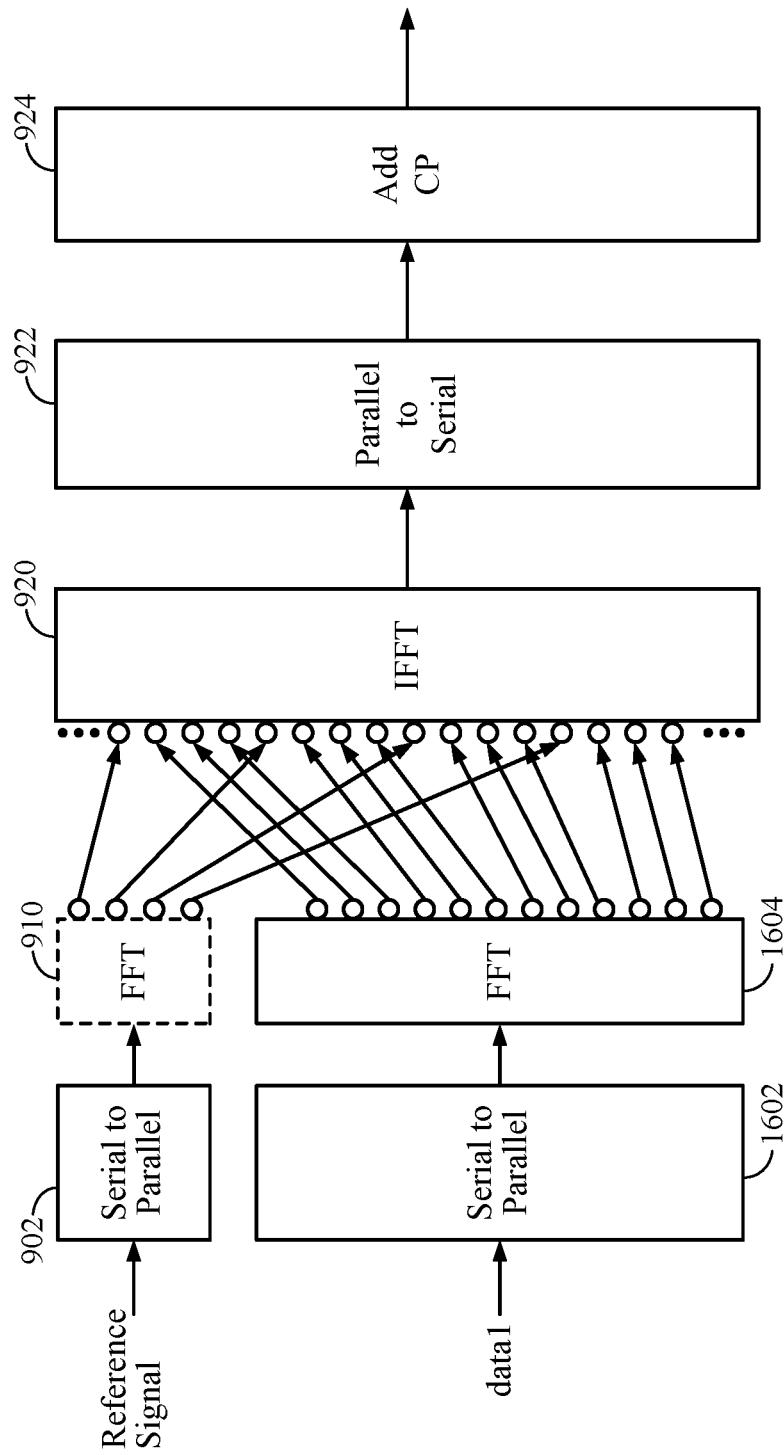
FIG. 16 illustrates example processing blocks for signal processing that for a ¼ ratio pilot overhead with separate DFT processing of reference signals and one larger size data block, in accordance with certain aspects of the present disclosure.

FIG. 16 illustrates another possible implementation for a pilot overhead ratio of ¼. As shown in FIG. 16, only two FFT processing blocks 910 and 1604 are used for the RS and a single larger size data block (e.g., with a size of for data three times larger than that of RS). As shown, the spread output RS samples can still be assigned the equal tone spacing of every fourth tone and the data1 samples may be assigned the tones between the RS samples. For example, the data1 may be assigned tones 1, 2, 3, 5, 6, 7, 9 between the assigned RS tones 4, 8, 12, and so on.

Figure 17:
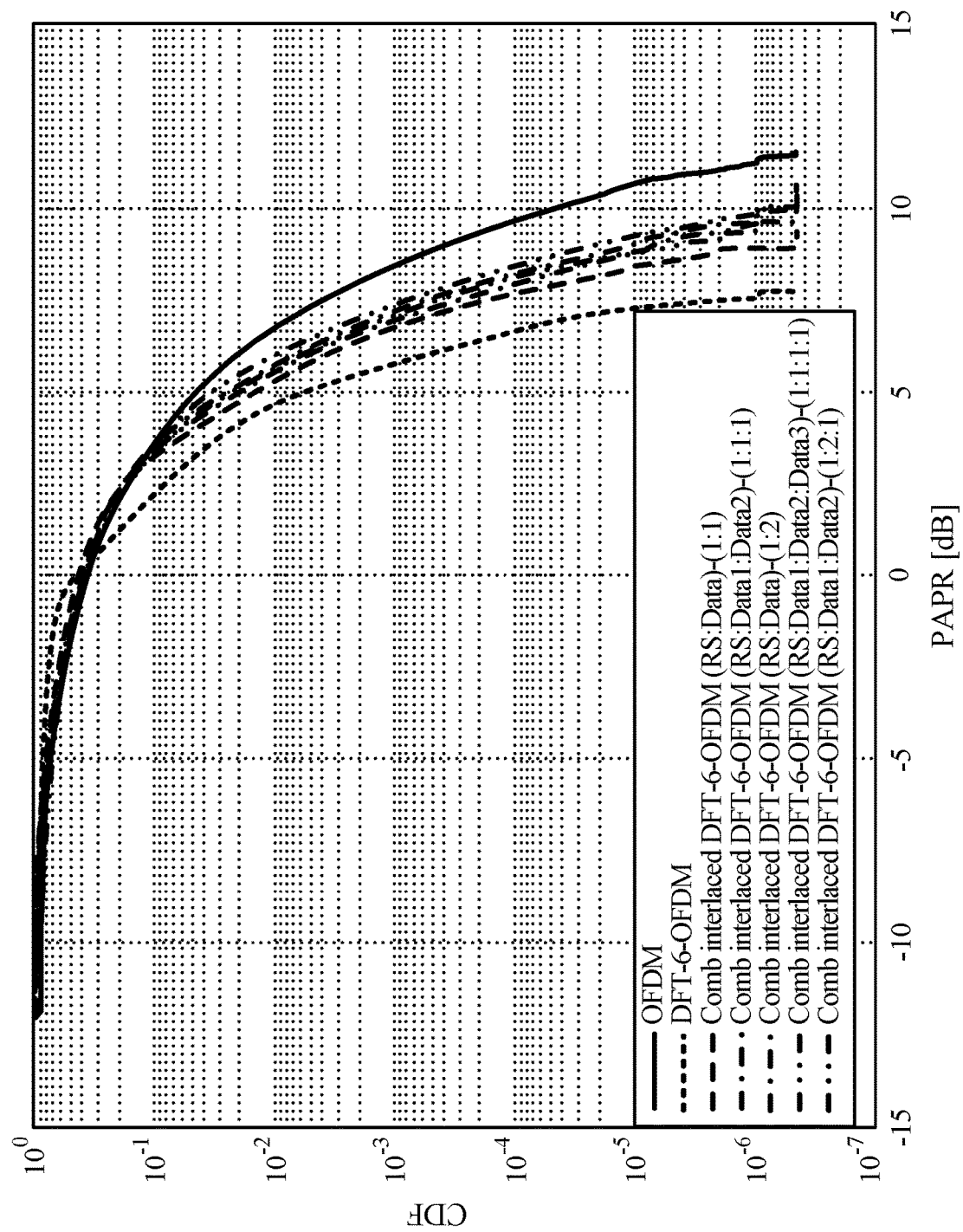
FIG. 17 is a graph illustrating example performance achievable with the signal processing, in accordance with certain aspects of the present disclosure.

FIG. 17 is an example graph 1700 illustrating performance benefits of UL transmissions using interlaced DFT-s-OFDM signal processing techniques describes herein. As shown, relatively low PAPR, in-line with conventional OFDM processing, can be achieved for the DFT-s-OFDM signals.

Figure 18:
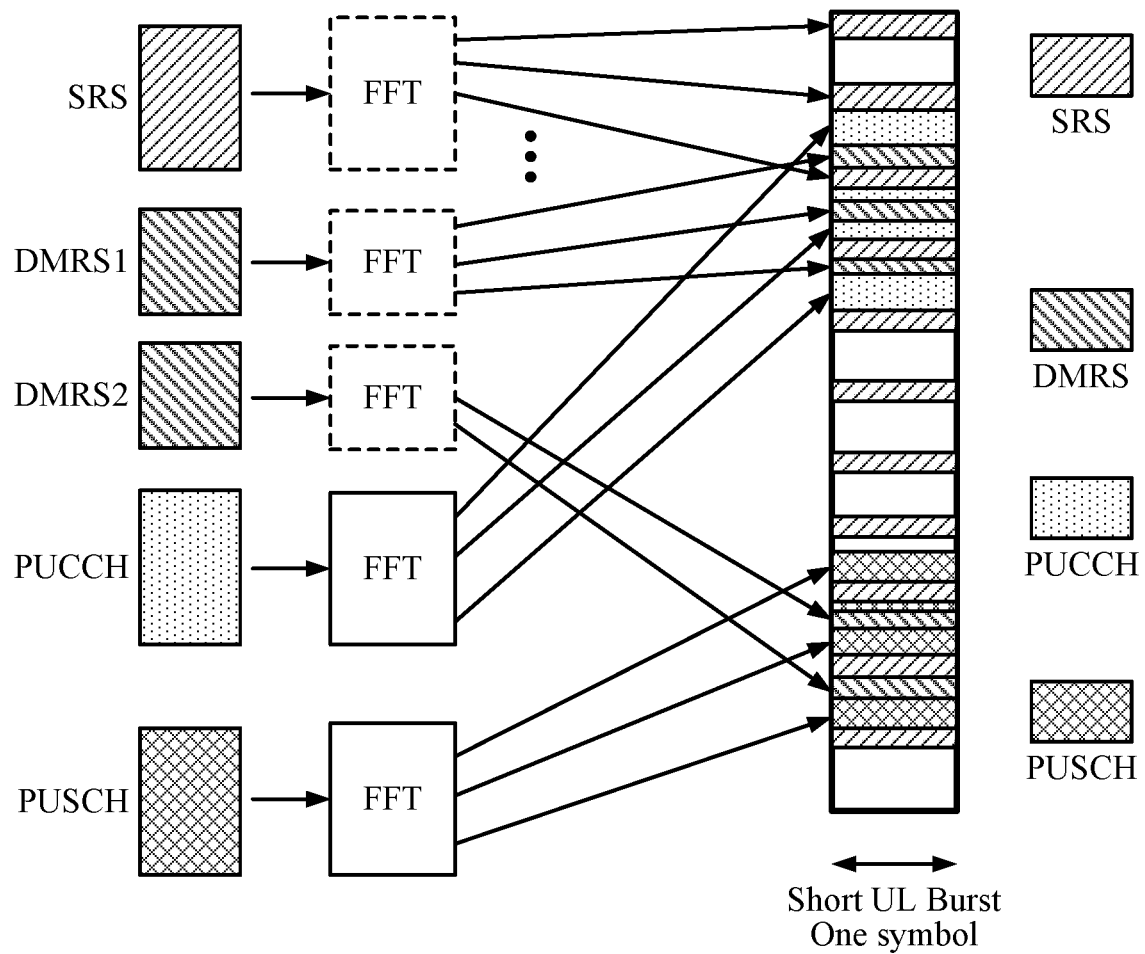
FIG. 18 illustrate additional example processing blocks for signal processing of multiple signals, in accordance with certain aspects of the present disclosure To facilitate understanding, identical reference numerals have been used, where possible, to designate identical elements that are common to the figures. It is contemplated that elements disclosed in one aspect may be beneficially utilized on other aspects without specific recitation.

As shown in FIG. 18, the interlaced DFT-s-OFDM processing described herein may be applied to various different RS (e.g., SRS, DMRS) and data signals (e.g., PUCCH and PUSCH). The separate DFT spreading may result in these signals being mapped to interlaced tones in a short UL burst OFDM symbol that allows for frequency division multiplexing (FDM), while still achieving low PAPR.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communications, comprising:
obtaining one or more sets of samples for one or more data signals and one or more sets of samples for one or more reference signals;
spreading the one or more sets of samples for the one or more data signals using a first one or more discrete Fourier transform (DFT) processing blocks;
spreading the one or more sets of samples for the one or more reference signals, using a second one or more DFT processing blocks different than the first one or more DFT processing blocks, based on the one or more reference signals having a first one or more bit sequences;
skipping spreading the one or more sets of samples for the one or more reference signals, based on the one or more reference signals having a second one or more bit sequences;
interlacing the spreaded sets of samples by assigning the spreaded sets of samples from each of the DFT processing blocks to non-consecutive, equally spaced apart tones; and
transmitting the one or more data signals and the one or more reference signals on the assigned tones in an orthogonal frequency division multiplexed (OFDM) symbol.

2. The method of claim 1, further comprising:
processing the interlaced spreaded sets of samples using an inverse Fast Fourier Transform (FFT) processing block to output the OFDM symbol.

3. The method of claim 1, wherein the DFT processing blocks use Fast Fourier Transforms (FFTs).

4. The method of claim 3, wherein at least two of the FFTs are of a different size.

5. The method of claim 1, wherein separate DFT processing blocks are used for different types of reference signals.

6. The method of claim 1, wherein a number of separate DFT processing blocks used for the one or more data signals is based, at least in part, on pilot overhead and a size of the one or more data signals.

7. The method of claim 6, wherein the spreaded sets of samples for the one or more reference signals are assigned an equal spacing of every other tone.

8. The method of claim 7, wherein the interlacing comprises:
assigning the spreaded sets of samples for one or more data signals or the one or more reference signals to odd tones; and
assigning the spreaded sets of samples for another of one or more data signals or the one or more reference signals to even tones.

9. The method of claim 6, wherein the spreaded sets of samples for the one or more reference signals are assigned an equal spacing of every third tone.

10. The method of claim 7, wherein:
two separate DFT processing blocks are used for the one or more data signals, and
the spreaded sets of samples for the one or more data signals are assigned an equal spacing of every third tone.

11. The method of claim 7, wherein:
one separate DFT processing block is used for the one or more data signals, and the spreaded sets of samples for the one or more data signals are assigned tones between the tones assigned for the at least one reference signal.

12. An apparatus for wireless communications, comprising:
- means for obtaining one or more sets of samples for one or more data signals and one or more sets of samples for one or more reference signals;
- means for spreading the one or more sets of samples for the one or more data signals using a first one or more discrete Fourier transform (DFT) processing blocks;
- means for spreading the one or more sets of samples for the one or more reference signals, using a second one or more DFT processing blocks different than the first one or more DFT processing blocks, based on the one or more reference signals having a first one or more bit sequences;
- means for skipping spreading the one or more sets of samples for the one or more reference signals, based on the one or more reference signals having a second one or more bit sequences;
- means for interlacing the spreaded sets of samples by assigning the spreaded sets of samples from each of the DFT processing blocks to non-consecutive, equally spaced apart tones; and
- means for transmitting the one or more data signals and the one or more reference signals on the assigned tones in an orthogonal frequency division multiplexed (OFDM) symbol.

13. The apparatus of claim 12, further comprising:
- means for processing the interlaced spreaded sets of samples using an inverse Fast Fourier Transform (FFT) processing block to output the OFDM symbol.

14. The apparatus of claim 12, wherein the DFT processing blocks use Fast Fourier Transforms (FFTs).

15. The apparatus of claim 14, wherein at least two of the FFTs are of a different size.

16. The apparatus of claim 12, wherein separate DFT processing blocks are used for different types of reference signals.

17. The apparatus of claim 12, wherein a number of separate DFT processing blocks used for the one or more data signals is based, at least in part, on pilot overhead and a size of the one or more data signals.

18. The apparatus of claim 17, wherein the spreaded sets of samples for the one or more reference signals are assigned an equal spacing of every other tone.

19. The apparatus of claim 18, wherein the means for interlacing comprises:
- means for assigning the spreaded sets of samples for one or more data signals or the one or more reference signals to odd tones; and
- means for assigning the spreaded sets of samples for another of one or more data signals or the one or more reference signals to even tones.

20. The apparatus of claim 17, wherein the spreaded sets of samples for the one or more reference signals are assigned an equal spacing of every third tone.

21. The apparatus of claim 18, wherein:
- two separate DFT processing blocks are used for the one or more data signals, and
- the spreaded sets of samples for the one or more data signals are assigned an equal spacing of every third tone.

22. The apparatus of claim 18, wherein:
- one separate DFT processing block is used for the one or more data signals, and
the spreaded sets of samples for the one or more data signals are assigned tones between the tones assigned for the at least one reference signal.

23. An apparatus for wireless communications, comprising:
- at least one processor coupled with a memory and configured to:
  - obtain one or more sets of samples for one or more data signals and one or more sets of samples for one or more reference signals;
  - spread the one or more sets of samples for the one or more data signals a first one or more discrete Fourier transform (DFT) processing blocks;
  - spread the one or more sets of samples for the one or more reference signals, using a second one or more DFT processing blocks different than the first one or more DFT processing blocks, based on the one or more reference signals having a first one or more bit sequences;
  - skip spreading the one or more sets of samples for the one or more reference signals, based on the one or more reference signals having a second one or more bit sequences;
  - interlace the spreaded sets of samples by assigning the spreaded sets of samples from each of the DFT processing blocks to non-consecutive, equally spaced apart tones; and
- a transmitter configured to transmit the one or more data signals and the one or more reference signals on the assigned tones in an orthogonal frequency division multiplexed (OFDM) symbol.

24. The apparatus of claim 23, wherein the at least one processor is configured to use separate DFT processing blocks for different types of reference signals.

25. The apparatus of claim 23, wherein a number of separate DFT processing blocks used for the one or more data signals is based, at least in part, on pilot overhead and a size of the one or more data signals.

26. A non-transitory computer readable medium having computer executable code stored thereon for wireless communications, comprising:
- code for obtaining one or more sets of samples for one or more data signals and one or more sets of samples for one or more reference signals;
- code for spreading the one or more sets of samples for the one or more data signals using a first one or more discrete Fourier transform (DFT) processing blocks;
- code for spreading the one or more sets of samples for the one or more reference signals, using a second one or more DFT processing blocks different than the first one or more DFT processing blocks, based on the one or more reference signals having a first one or more bit sequences;
- code for skipping spreading the one or more sets of samples for the one or more reference signals, based on the one or more reference signals having a second one or more bit sequences;
- code for interlacing the spreaded sets of samples by assigning the spreaded sets of samples from each of the DFT processing blocks to non-consecutive, equally spaced apart tones; and
- code for transmitting the one or more data signals and the one or more reference signals on the assigned tones in an orthogonal frequency division multiplexed (OFDM) symbol.

27. The non-transitory computer readable medium of claim 26, wherein separate DFT processing blocks are used for different types of reference signals.

28. The non-transitory computer readable medium of claim 26, wherein a number of separate DFT processing blocks used for the one or more data signals is based, at least in part, on pilot overhead and a size of the one or more data signals.

* * * * *